May 10, 1927.
W. H. POWELL
1,628,612
DYNAMO ELECTRIC MACHINE AND WINDING THEREFOR
Filed June 21, 1926
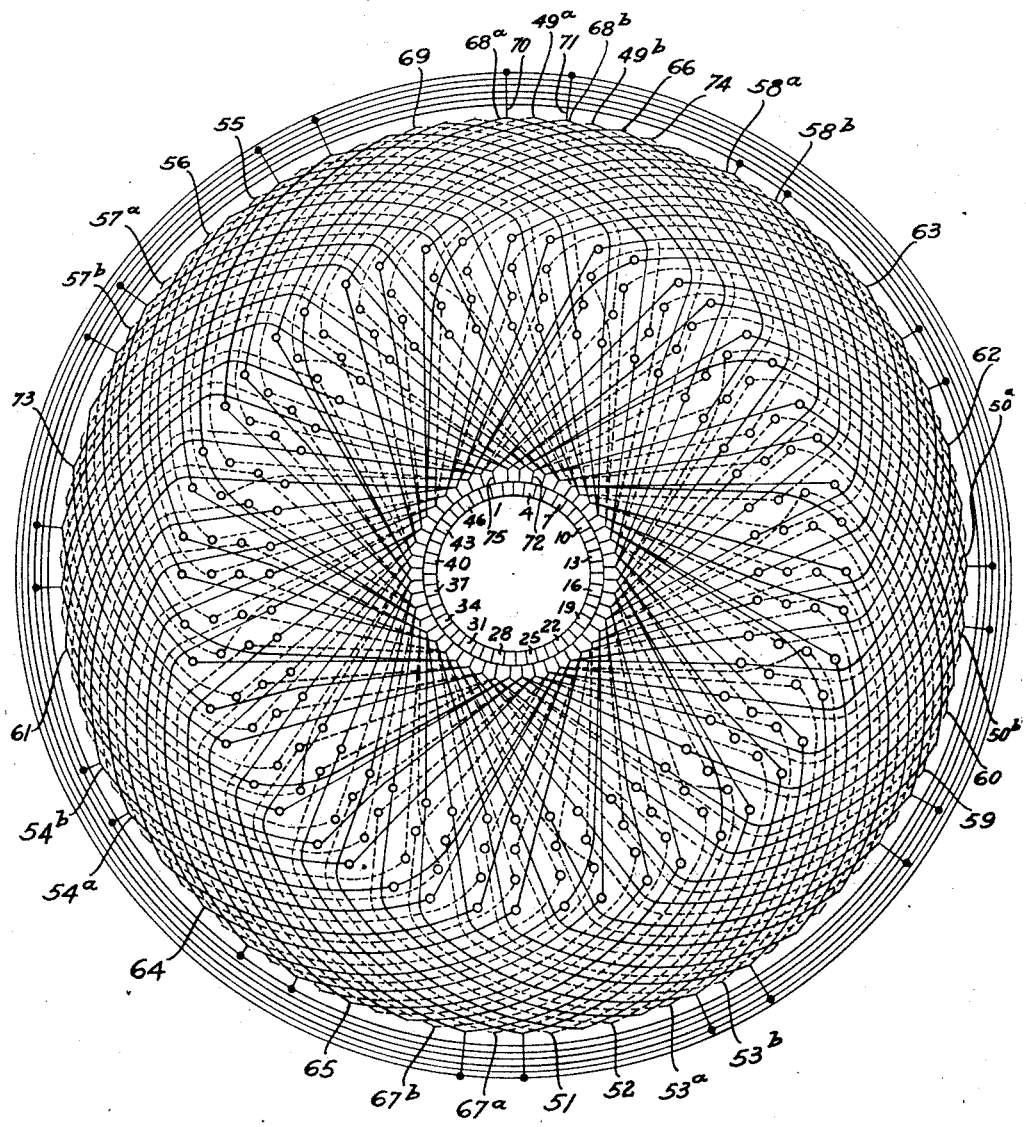
Inventor
W. H. Powell
by G. J. DeWein
Attorney Patented May 10, 1927.

1,628,612

UNITED STATES PATENT OFFICE.

WILLIAM H. POWELL, OF WAUWATOSA, WISCONSIN, ASSIGNOR TO ALLIS-CHALMERS MANUFACTURING COMPANY, OF MILWAUKEE, WISCONSIN, A CORPORATION OF DELAWARE.

DYNAMO-ELECTRIC MACHINE AND WINDING THEREFOR.

Application filed June 21, 1926. Serial No. 117,215.

This invention relates to dynamo-electric machines and windings therefor.

One of the objects is to provide a wave type winding in which all of the coils are not wave wound, and more specifically to provide a winding comprising wave wound coils in combination with lap wound coils.

Another object is the provision of a winding in which the currents in the various armature paths will be equalized without the use of cross-connectors. Still another object is the provision of a winding in which the potential rise from one brush to another measured from bar to bar on the commutator will form a substantially smooth curve.

Still another object is the provision of an armature for machines in which taps or phase connections are necessary such as in machines of the three-wire type, or rotary converters and in which no external cross-connectors are necessary. A further object is to provide an armature having both lap and wave wound coils which may be used for rotary converters or other machines involving taps or phase connections. A still further object is to provide a winding for machines of the hereinbefore mentioned character in which heating of the winding at the taps or phase connection points is avoided.

Another object is the provision of a winding in which in a given armature circuit lap and wave wound coils are connected in series; and in which predetermined lap wound coils in a given armature circuit are respectively influenced by different pairs of poles.

A further object is to provide windings of the hereinbefore mentioned characters in which the end connections are simplified, and more specifically whereby formation of the coils is made easier by the avoidance of radial bends in the end connections as shown for example, in applicant's copending application S. N. 89,017, filed Feb. 18, 1926.

Still another object is the provision of windings of the hereinbefore mentioned characters which are easily and comparatively cheaply insulated.

Other objects will appear hereinafter as the description of the invention proceeds.

The novel features of the invention will appear from this specification and the accompanying drawing forming a part thereof and showing one embodiment of the invention, and all these novel features are intended to be pointed out in the claims.

The single figure of the drawing is a diagrammatic showing of a dynamo-electric machine embodying the invention.

Referring to the drawing the machine here illustrated has 48 commutator bars and 24 slots. In order to avoid confusion with the armature winding the poles have not been shown but the winding is adapted for use in a 4 pole machine. The slots have not been shown but it will be noted that the radial rows of 4 conductors each, indicated by the small circles, are paired, that is, adjacent radial rows of conductors which are intended for the same slot are shown disposed closer together than the space between the next set of radial rows. In the particular machine illustrated there are 8 conductors per slot.

The conductors, 192 in number, disposed in the armature slots are provided with end connections such that 48 lap wound coils and 48 wave wound coils are formed, the lap coils being distinguished by the dotted lines and the wave coils by the full lines. There being 24 slots and 48 lap wound coils there are two lap coils per slot. The same is true as to the wave coils. If we number the concentric conductors layers in the slots from the outside radially inward consecutively, as 1, 2, 3 and 4, it will be noted that the wave coils occupy positions Nos. 1 and 4 whereas the lap coils occupy positions Nos. 2 and 3. There is no reason however why the lap coils might not occupy positions Nos. 1 and 4 and the wave coils positions Nos. 2 and 3.

A clearer understanding of the invention may be had by tracing one of the armature circuits. For example, if we assume that the bar 4 is under a positive brush (not shown) and the bar 16 under a negative brush (not shown) we may, for example, trace an armature circuit from bar 4 to bar 16. Connected to bar 4 are 2 lap coils $49^a$, $49^b$ the coil sides of which are disposed in the same slots respectively and the other end connections of which are connected to bar 3. From bar 3 to bar 26 is a double wave coil 50ª, 50ᵇ whose coil sides are also disposed in the same slots respectively. Continuing from bar 26 we go through a single lap coil 51 to bar 25, from there through a single lap coil 52 to bar 24, from there through a double lap coil 53ª, 53ᵇ to bar 23, from there through a double wave coil 54ª, 54ᵇ to bar 46, from there through a single lap coil 55 to bar 45, then through a single lap coil 56 to bar 44, then through a double lap coil 57ª, 57ᵇ to bar 43, then through a double wave coil 58ª, 58ᵇ to bar 18, then through a single lap coil 59 to bar 17, then through a single lap coil 60 to bar 16. This does not complete the entire armature circuit here shown inasmuch as from bar 26 to bar 1 is a single wave coil 61 and from there to bar 24 is a single wave coil 62. It will be noted that the wave coils 61, 62 which are influenced by all 4 poles are so disposed as to have generated in them an electromotive force which is equal and opposite to that of the group of lap coils comprising coils 51 and 52, the terminals of the group of wave coils and the group of lap coils being the same, namely, bars 26 and 24. In addition, lap coils 55 and 56 are balanced in a similar manner by a pair of wave coils 63, 64 connected from bar 46 to 21 to 44. In addition lap coils 59 and 60 are balanced in a similar manner by wave coils 65, 66 connected from bar 18 to 41 to 16.

In further explanation of the arrangement and pitches of the coils, and by way of example, it is to be noted that lap coils 49ª, 49ᵇ are symmetrically disposed with respect to a double lap coil 67ª, 67ᵇ connected to bars 27 and 28. Stated in other words, these pairs of lap coils are disposed 360 electrical degrees from each other. Moreover, one side of the double wave coil 50ª, 50ᵇ occupies the same slot as the side of the double lap coil 67ª, 67ᵇ which is connected to bar 27. The other side of the double wave coil 50ª, 50ᵇ occupies the same slot as the side of the double lap coil 49ª, 49ᵇ which is connected to the bar 4. It will be noted however that while the double wave coil 50ª, 50ᵇ is connected to one of the bars to which double lap coil 49ª, 49ᵇ is connected, namely, bar 3, the commutator pitch of this double wave coil is less than 360 degrees in the illustrated winding and is therefore not connected to either of the bars to which double lap coil 67ª, 67ᵇ is connected. More specifically, the commutator pitch of the wave coils is one bar less than the number of bars per pair of poles if the lap coils are progressively wound and is one bar more than said number if the lap coils are retrogressively wound.

It will moreover be observed that in the same slots occupied by double lap coil 49ª, 49ᵇ is disposed a double wave coil 68ª, 68ᵇ the terminals of which are connected to the same bars respectively, namely, bars 39 and 14. It will be further noted that in the particular machine illustrated there are 12 of such sets of double lap and double wave coils as 49 and 68 and this arrangement of the coils adapts the winding for use in a 6 phase rotary converter. The slip rings are indicated by the 6 concentric continuous circles disposed for purposes of clearness of illustration outside of the winding proper. In the machine illustrated the coil 68ª is connected by a conductor 70 to the outer slip ring, the coil 68ᵇ being likewise connected to the same slip ring by a conductor 71. It is of course to be understood that this representation is diagrammatic and that there may be but a single conductor between the end turns of the coils 68ª, 68ᵇ and the slip ring to which these coils are connected. In like manner the other pairs of wave coils disposed at phase connection points may be connected to the appropriate slip rings as clearly indicated on the drawing. The phase connections have been indicated as made to the wave wound coils at phase connection points for the reason that such connection, if the wave wound conductors occupy positions Nos. 1 and 4 in the slots, is the most convenient. There is no reason however why the phase connections might not be made to the double lap coils, such as 49ª, 49ᵇ and so on.

In addition to the equalization obtained as already set forth other equalizing conditions are obtained as may be seen by the following. For example, a lap coil 69 having its terminals connected to bars 1 and 48 is disposed symmetrically with respect to a lap coil 52 having its terminals connected to bars 24 and 25 and a wave coil 62 has its terminals connected to bars 1 and 24. Bars 24 and 48 are equipotential bars as are also bars 1 and 25. Inasmuch as coil 69 and coil 62 are disposed to generate equal and opposite electromotive forces an equalizing connection is formed between bars 24 and 48 through which normally no equalizing current flows. Both of these coils are however load-current-carrying coils. In the same manner coil 62 is balanced against coil 52 these two forming an equalizing connection between bars 1 and 25. With this explanation it is not necessary to consider any of the other coils of the winding as it may be readily seen how by similar balancing of the other coils the currents and electromotive forces in the winding are equalized and evenly distributed around the commutator.

In addition to the equalization hereinbefore pointed out it is to be noted that the various armature circuits are interconnected with each other. If we arbitrarily number the armature circuit extending from bar 4 to bar 16 as No. 1 and that from bar 16 to bar 28 as No. 2 and from there to bar 40 as No. 3 and from there to bar 4 as No. 4, then in the particular machine illustrated it will be noted that circuits Nos. 1 and 3 are interconnected at bars 17, 21, 25, 41, 45 and 1 while circuits Nos. 2 and 4 are interconnected at bars 5, 9, 13, 29, 33 and 37. Circuits Nos. 2, 3, and 4 may be readily traced in the same manner as already done for circuit No. 1, and each of the four circuits is influenced by all of the four poles.

For the sake of clearness and illustration, the end connections of the coils have been shown as leading to the same point on the individual commutator necks. It will however be observed, taking for example the commutator neck 72 connected to bar 4, that the end connections of the double lap coil 49ª, 49ᵇ, come out from the armature to the commutator neck in a layer corresponding to slot position No. 3 whereas to the same neck is connected one end of a wave coil 73 in slot position No. 4 and also one end of a lap coil 74 in slot position No. 2. The end connections to bar 4 of the double lap coil hereinbefore noted are preferably placed circumferentially side by side in the commutator neck. As to neck 72 there is thus no end connection corresponding to slot position No. 1. If desired a filler or dummy may be used in the otherwise vacant neck space. On the other hand, a neck such as 75 connected to bar 1 has one conductor in each of the four concentric layers of end connections corresponding to slot positions 1, 2, 3, and 4, as may be readily seen by tracing the end connections from the neck to the armature conductors. It will therefore be apparent that each end connection may be brought out to a layer corresponding in each instance to the slot position of the conductor of a given end connection. It is therefore unnecessary to bend the end connections into layers other than those associated with the corresponding conductors.

It will be noted that in a winding in accordance with the present invention full difference of potential exists only between radially adjacent conductors and not between circumferentially adjacent conductors so that at no place is insulation for full difference of potential necessary between circumferentially adjacent conductors in the same slot.

It will of course be understood that the particular winding is merely illustrative and that the factors of the winding or machine, such as the number of poles, coils, bars, slots, etc., may be varied as desired.

It should be understood that it is not desired to limit the invention claimed to the exact details of construction shown and described, for obvious modifications may occur to persons skilled in the art.

It is claimed and desired to secure by Letters Patent:

1. A multipolar type armature winding having lap wound coils adapted to be disposed under different pairs of poles and a wave wound coil connecting them in series.

2. A multipolar type armature winding having a group of consecutive lap wound coils adapted to be disposed under a pair of poles, another group of consecutive lap wound coils adapted to be disposed under a different pair of poles and a wave wound coil connecting said groups in series.

3. A multipolar type armature winding having lap wound coils adapted to be disposed under different pairs of poles and two wave wound coils in parallel connecting them in series.

4. A multipolar type armature winding having a group of consecutive lap wound coils adapted to be disposed under a pair of poles, another group of consecutive lap wound coils adapted to be disposed under a different pair of poles and two wave wound coils in parallel connecting them in series.

5. A multipolar commutator type armature winding having a plurality of lap wound and wave wound coils, a predetermined number of said lap wound coils which are symmetrically disposed with respect to poles of the same sign having their end connections connected to the same commutator bars respectively, and a predetermined number of said wave wound coils having an end connection connected to one of said bars.

6. A multipolar commutator type armature winding having a plurality of lap wound and wave wound coils, a predetermined number of said lap wound coils which are symmetrically disposed with respect to poles of the same sign having their end connections connected to the same commutator bars respectively, and a predetermined number of said wave wound coils having a commutator pitch less than 360 electrical degrees and having an end connection connected to one of said bars.

7. A multipolar commutator type armature winding having a plurality of lap wound and wave wound coils, a predetermined number of said lap wound coils which are symmetrically disposed with respect to poles of the same sign having their end connections connected to the same commutator bars respectively, and a predetermined number of said wave wound coils having a commutator pitch less than 360 electrical degrees and having an end connection connected to one of said bars, said predetermined number of wave wound coils having their induced portions disposed in the same slots as the nearest sides of said predetermined number of lap wound coils.

8. In an armature winding, an armature circuit including lap wound and wave wound coils in series with each other, and a predetermined number of additional wave wound coils in parallel with certain of said lap wound coils.

9. In an armature winding, an armature circuit including lap wound and wave wound coils in series with each other, and a predetermined number of additional wave wound coils in parallel with certain of said lap wound coils, said last named lap wound coils being influenced by a single pair of poles and said parallel wave wound coils being influenced by more than a single pair of poles.

10. In a multipolar type armature winding, an armature circuit including lap wound coils adapted to be disposed under different pairs of poles, a wave wound coil connecting them in series, and a predetermined number of additional wave wound coils in parallel with certain of said lap wound coils.

11. In a multipolar type armature winding, an armature circuit including lap wound coils adapted to be disposed under different pairs of poles, a wave wound coil connecting them in series, and a predetermined number of additional wave wound coils in parallel with certain of said lap wound coils, said last named lap wound coils being influenced by a single pair of poles and said parallel wave wound coils being influenced by more than a single pair of poles.

12. An armature provided with a predetermined number of slip rings, a winding for said armature including a predetermined number of lap wound and wave wound coils, and connections between said slip rings and certain of said wave wound coils.

13. A slotted commutator type armature provided with a predetermined number of slip rings, a winding for said armature including at least two lap wound coils in the same slot, having their terminals connected respectively to the same commutator bars, at least two wave wound coils in the same said slots having their terminals connected respectively to the same bars other than the aforesaid bars, and a connection between one of said slip rings and one of said sets of coils.

14. An armature provided with a predetermined number of slip rings, an armature winding, a circuit thereof including lap wound and wave wound coils in series with each other, and a connection from one of said rings to one of said wave wound coils.

15. A multipolar type armature provided with a predetermined number of slip rings, an armature winding, a circuit thereof including lap wound coils adapted to be disposed under different pairs of poles, a wave wound coil connecting said lap coils in series, and a connection from one of said slip rings to said wave coil.

16. A multipolar type armature provided with a predetermined number of slip rings, an armature winding, a circuit thereof including lap wound coils adapted to be disposed under different pairs of poles, a wave wound coil connecting said lap coils in series, a connection from one of said slip rings to said wave coil, and a predetermined number of additional wave wound coils in parallel with certain of said lap coils.

17. In an armature including lap wound coils and wave wound coils, having end connections in concentric layers, a predetermined number of said lap wound coils in the same slot each having its end connections in different concentric layers, the corresponding end connection being connected to the same commutator neck in the same layer, and a predetermined number of wave wound coils disposed in the same slot each coil having its end connections in different concentric layers the corresponding end connections being connected to the same commutator neck in the same layer.

18. A multipolar type armature winding, an armature circuit having a predetermined number of lap wound coils, and means for connecting said lap coils so that said armature circuit is influenced by more than one pair of poles.

19. A multipolar type armature winding, an armature circuit having a predetermined number of lap wound coils, means for connecting said lap coils so that said armature circuit is influenced by more than one pair of poles, another armature circuit, and equalizing connections between said armature circuits.

20. A multipolar type armature winding, an armature circuit having a predetermined number of lap wound coils, means for connecting said lap coils so that said armature circuit is influenced by more than one pair of poles, another armature circuit, said armature circuits including a predetermined number of wave wound coils serving to equalize said armature circuits.

21. A commutator type armature provided with a predetermined number of slip rings, a winding for said armature, a predetermined number of the coils of which have their coil sides disposed in the same circumferential layer in the same slots respectively and their end connections connected to the same commutator bars respectively, and a connection from one of said slip rings to said predetermined number of coils.

22. A commutator type armature provided with a predetermined number of slip rings, a winding for said armature including lap and wave wound coils, a predetermined number of the coils of which have their coil sides disposed in the same slots respectively and their end connections connected to the same commutator bars respectively, said predetermined number of coils having their end connections and induced portions in the same layers as the corresponding portions of the remaining coils of the same kind, and a connection from one of said slip rings to said predetermined number of coils.

In testimony whereof, the signature of the inventor is affixed hereto.

WILLIAM H. POWELL.

Certificate of Correction.

Patent No. 1,628,612.  Granted May 10, 1927, to
WILLIAM H. POWELL.

It is hereby certified that error appears in the printed specification of the above-numbered patent requiring correction as follows: Page 4, line 84, claim 17, for the word " connection " read *connections;* and that the said Letters Patent should be read with this correction therein that the same may conform to the record of the case in the Patent Office.

Signed and sealed this 21st day of June, A. D. 1927.

[SEAL.]

M. J. MOORE,
*Acting Commissioner of Patents.*